(12) United States Patent
Tamian

(10) Patent No.: US 7,549,249 B2
(45) Date of Patent: Jun. 23, 2009

(54) REVERSE ACTION, SPRING-LOADED FISHING TACKLE DEVICE

(75) Inventor: Richard Tamian, 69 Edison Ter., Sparta, NJ (US) 07871

(73) Assignee: Richard Tamian, Sparta, NJ (US)

(*) Notice: Subject to any disclaimer, the term of this patent is extended or adjusted under 35 U.S.C. 154(b) by 554 days.

(21) Appl. No.: 11/514,501

(22) Filed: Sep. 1, 2006

(65) Prior Publication Data

US 2008/0052980 A1    Mar. 6, 2008

(51) Int. Cl.
*A01K 91/06* (2006.01)
(52) U.S. Cl. .................. 43/42.72; 43/15; 43/42.02; 43/35; 267/70; 267/71
(58) Field of Classification Search .......... 43/15, 43/42.02, 42.72, 35, 37; 267/286, 289, 291, 267/71, 72, 70, 69, 174, 175, 177; 403/166, 403/43, 45, 46; 188/166
See application file for complete search history.

(56) References Cited

U.S. PATENT DOCUMENTS

| 2,631,401 | A | * | 3/1953 | Kritzer | 43/43.12 |
| 4,681,303 | A | * | 7/1987 | Grassano | 267/113 |
| 6,669,178 | B2 | * | 12/2003 | Ookawara | 267/71 |
| 7,000,908 | B2 | * | 2/2006 | Costello et al. | 267/74 |
| 7,069,686 | B1 | * | 7/2006 | Tamian | 43/42.72 |

* cited by examiner

*Primary Examiner*—Michael R Mansen
*Assistant Examiner*—Joshua J Michener

(57) ABSTRACT

The inline reverse action, spring-loaded fishing tackle device of the invention is a simple but effective device used inline with any fishing rod and lure that aids in the capture of fish. The device is comprised of a cylindrical shaped casing divided into two interior chambers which house a unique reverse action, spring mechanism that automatically maintains a constant counter force on the fishing line against the tugs and pulls caused by the erratic movements of a caught fish, whereby not only helping to hook the fish but also preventing any slack in the fishing line that could cause the loss of said fish.

10 Claims, 3 Drawing Sheets

REVERSE ACTION, SPRING-LOADED FISHING TACKLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF INVENTION

The present invention relates generally to a spring-activated, inline fishing tackle device that aids in the capture of fish when used in conjunction with a fishing rod and lure. Catching a fish requires not only proper technique but also having the proper equipment, such as with my new reverse action, spring-loaded fishing tackle device. My previously designed fishing tackle device, U.S. Pat. No. 7,069,686 issued to Tamian (2006), uses more parts than my new device and therefore would cost more money to manufacture. My newly designed device; costs less; works more efficiently; and produces the necessary constant counter force on the fishing line against the tugs and pulls caused by the erratic movements of a caught fish, whereby eliminating any slack in the fishing line.

BRIEF SUMMARY OF THE INVENTION

The inline reverse action, spring-loaded fishing tackle device of the invention is a simple but effective device used in conjunction with a fishing rod, lure, and most other fishing tackle accessories to aid in the capture of fish. The device is comprised of a cylindrical shaped casing with two interior chambers which house a unique reverse action spring mechanism that automatically supplies the proper, resistive force on the tugs and pulls produced by a hooked fish, whereby keeping the fishing line taut and preventing any slack that may cause the loss of said fish. When an outside force pulls the line cords outward, both halves of the spring compress into the center spacer-disk, and conversely, when the applied outside force ceases, the spring restores to its original state, thus always producing and maintaining a constant resistive force on the line cords. The stiffness specification of the spring used in the device is selected depending on the size and type of fish being sought. The inline, reverse action spring-loaded fishing tackle device of the invention is novel in its design and can be used with almost all types of fishing rods, reels, lines, floatation devices and lures. Other advantages and essential details of the invention will become apparent from the subsequent description of preferred embodiments, the drawings, and the claims.

DETAILED DESCRIPTION OF THE INVENTION

Figure 1:
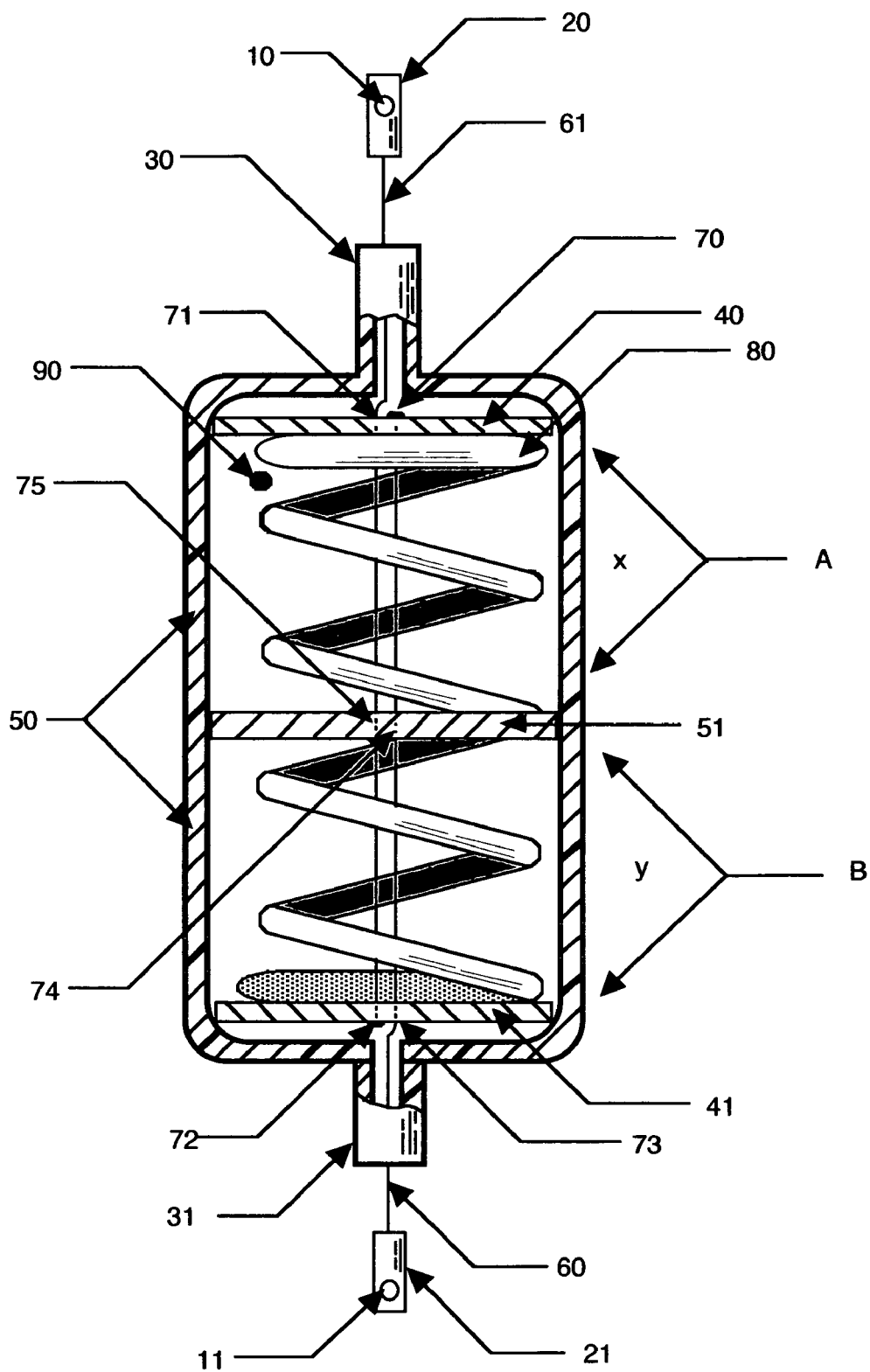
FIG. 1 is a simplified view of a reverse action, spring-loaded fishing tackle device according to the invention, shown in partial section, illustrates a cylindrical casing 50 which houses a unique reverse action spring mechanism which is composed of a compression spring 80, wherein end washer-disks 40 and 41 are positioned one on each end of said spring, cords 60 and 61, and a partially-split, spacer-disk 51 which is secured in the center of said device, dividing the interior chamber 90 into two sections A and B. Port openings 30 and 31 protrude from the cylindrical casing, one from each end respectively. Each of the line cords 60 and 61 are secured to an end washer disk 40 and 41 respectively, and both cords run longitudinally through the middle of the spring coils and extend out through the port openings 30 and 31 respectively. Fastened to the end of line cord 61 is an attachment bar 20 for a fishing line, while the fishing hook, lure, sinker, and any other fishing tackle accessories are tied to attachment bar 21 on the end of line cord 60.
Figure 2:
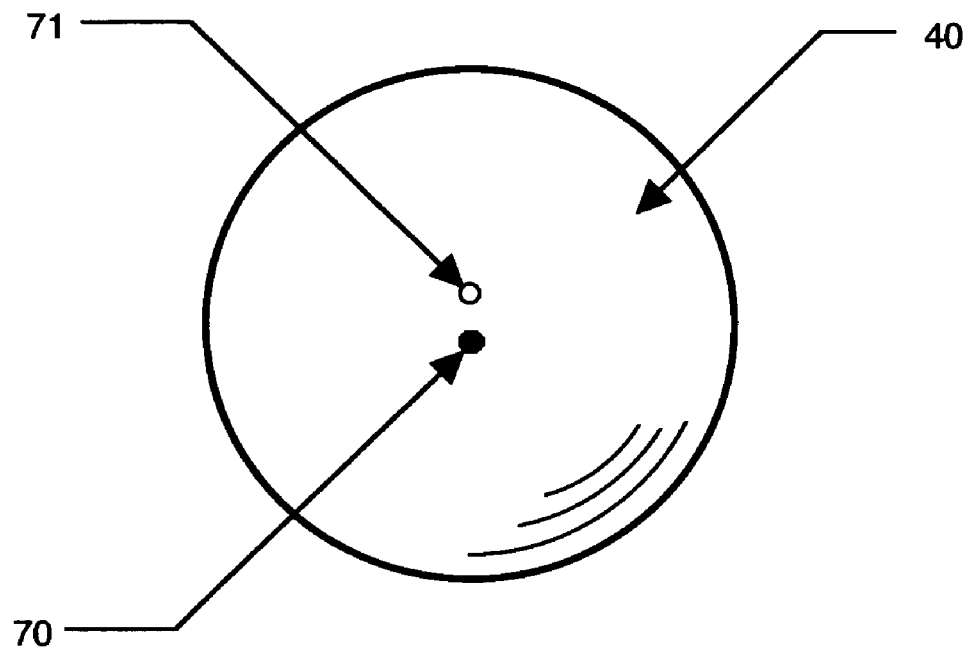
FIG. 2 is a simplified top view of the end washer-disks 40 and 41, according to the invention, illustrating their respective holes 71 and 73 with line cord anchor locations at 70 and 72 respectively.
Figure 2:
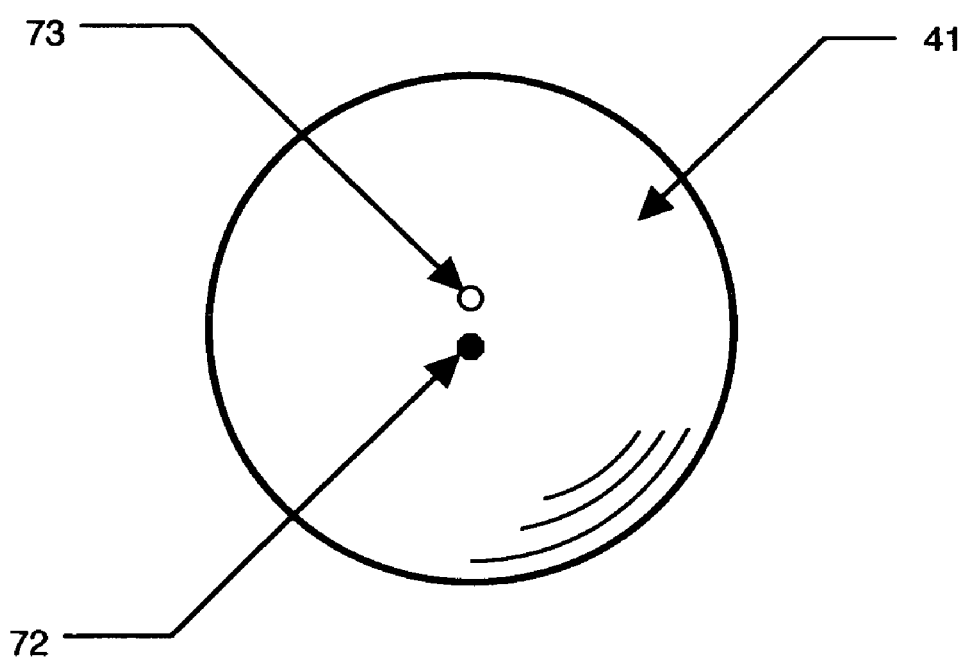
Figure 3:
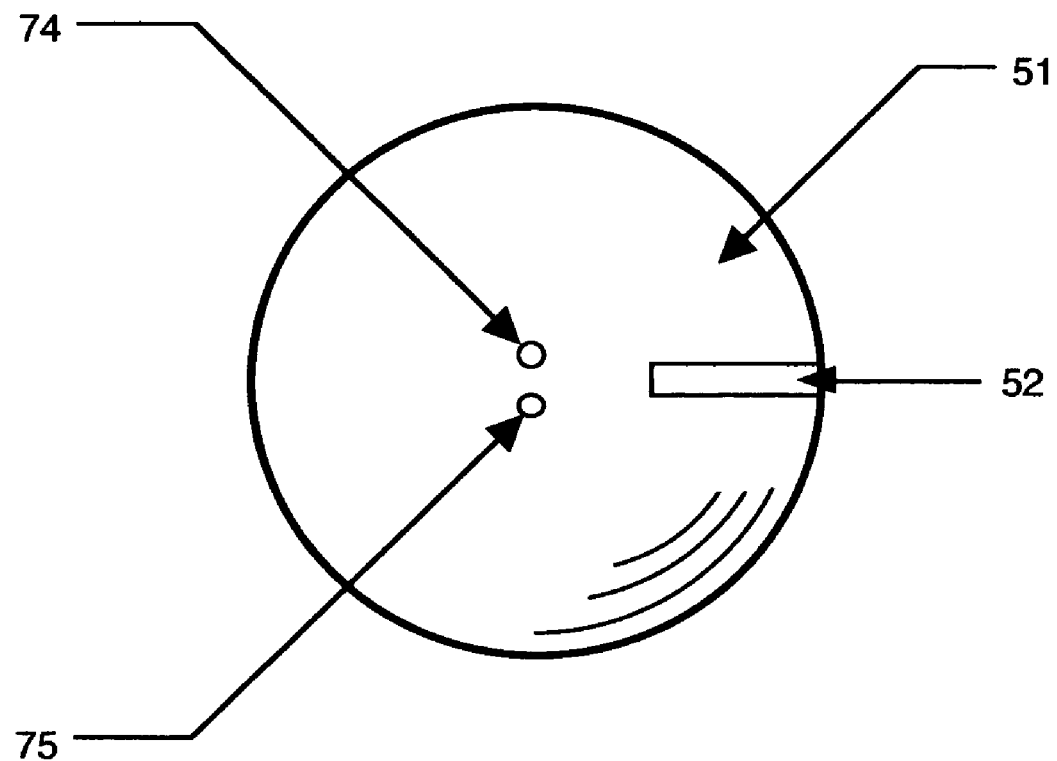
FIG. 3 is a simplified top view of the partially-split, center spacer-disk, according to the invention, illustrating the partially split section 52 and holes 74 and 75.

Referring particularly to FIG. 1, the reverse action, spring-loaded fishing tackle device according to the illustrated embodiment comprises a cylindrical shaped casing 50 with an opening port 30 at one end of the device and another opening port 31 at the other end, with an interior chamber 90 which houses a spring mechanism that is composed of a compression spring 80, two end washer-disks 40 and 41, a partially-split center compressional barrier-disk 51, and two line cords 60 and 61, such that said spring 80 extends the length of said chamber and having a circular diameter less than the chamber's interior cross-sectional diameter. A partially-split, center spacer-disk 51 is permanently positioned halfway within the cylinder casing thus dividing the interior chamber 90 into two sections A and B, but allows the spring to pass through it. An end washer-disk 40, whose radial diameter is greater than the spring's outer diameter and less than the chamber's interior cross-sectional diameter, is positioned at one end of said spring while a similar washer-disk 41 is placed at the other end of said spring. Each end washer-disk (40 and 41) is placed between the end of the spring and just below a port opening, such that said disk's radial axis runs perpendicular to the chamber's major longitudinal axis. Line cord 60 is secured to washer-disk 40 at position 70 and extends through the spring's coils longitudinally, through chamber 90 section A, through hole 74 (FIG. 3) in the partially-split, center spacer-disk 51, through chamber 90 section B, through hole 73 (FIG. 2) in the opposite end washer-disk 41, and out through port opening 31. An attachment bar 21 on the end of line cord 60 is used to tie a fishing hook, lure, sinker, and other tackle accessories onto it. Similarly, line cord 61 is secured to washer-disk 41 at location 72, and extends through the spring's coils longitudinally, through chamber 90 section B, through hole 75 of the partially-split, center spacer-disk 51, then through chamber 90 section A, through hole 71 of the end washer-disk 40, and out through port opening 30. A similar attachment bar 20 on the end of line cord 61 is used to tie the fishing reel line onto it.

The spring 80 in the mechanism of the device is selected for its counter force that would appropriately match the applied force exerted by a particular size and type of fish being sought. When an outside force produced by a caught fish is applied to line 60, both line 60 and line 61 get pulled apart outwardly, causing the end washer-disks 40 and 41, to which they are attached respectively, to be pulled inward toward the center spacer-disk, thus causing both halves of the spring to be compressed against said center spacer-disk by a length of (x) for the spring portion in chamber 90 section A and length (y) for the spring portion in chamber 90 section B. According to Hook's Law the force supplied by the compressed spring is equal to the spring's stiffness constant times the compressional displacement (x+y). As long as the spring remains in compression, a constant force is maintained on line cords 60 and 61 against the tugs and pulls by the hooked fish, whereby eliminating any slack in the fishing line.

There are major advantages with my unique reverse action design for the spring mechanism of the invention. First, it reduces the amount of space required for the spring mechanism to function. If the spring were to be stretched outwardly instead, the casing would have to be long enough to accommodate both the original spring length, in its passive state, plus the length in its extended mode. However, since the spring compresses into itself, the size of the casing only needs to be the initial length of the spring. Secondly, since the spring compresses inwardly upon itself, there is no chance of the spring being stretched beyond its elastic limit, causing the failure of said device. And since there are no outward forces pulling against the casing and port openings, there is no chance of the housing being pulled apart with any sudden jerks, which would cause the destruction of said device and the loss of said fish.

The partially-split, center spacer-disk 51 (FIG. 3) has a slit 52 in it that allows the spring's center coil to pass through the spacer 51, and not around the outside of it, which permits the use of one spring with half its coils located in section A and the other half in section B of the interior chamber 90. This partially-split, center spacer-disk 51 is multifunctional. It acts as a compressional barrier for both sections of the spring to squeeze against. It prevents the spring coils from getting entangled during compression. And this disk keeps the entire spring mechanism, from shifting within the housing when activated.

What I claim as my invention is:

1. A reverse action, spring-loaded fishing tackle device comprising:
   a cylindrical shaped casing having an interior chamber with a first port opening at a first end of said casing and a second port opening at a second end of said casing; said casing housing a spring mechanism;
   said spring mechanism comprises:
      a compression spring with coils;
      first and second end washer-disks;
      first and second line cords; and
      a partially-split, circular spacer-disk;
   said partially-split, circular spacer-disk is secured to a center of the casing of said device dividing the interior chamber into two sections in which said coils extend longitudinally through both sections passing through a slit in said partially-split, center spacer-disk;
   said first end washer-disk is located at a first end of said spring below said first port opening, wherein said first line cord is secured to said first end washer-disk and extends longitudinally through the center of half of the coils, passing through a hole in the partially-split, center spacer-disk, then through the remaining half of the coils, through a hole in said second end washer-disk and out through said second port opening; wherein said first line cord has an end that is configured for securing a fishing reel line; and
   said second end washer-disk is located at a second end of said spring above said second port opening, wherein said second line cord is secured to said second end washer-disk and extends longitudinally through the center of half of the spring's coils, passing through a second hole in the partially-split, center spacer-disk, then through the remaining half of the coils, through a hole in said first end washer-disk and out through said first port opening; wherein said second line cord has an end that is secured to a fishing hook, lure, or other tackle devices.

2. A reverse action, spring-loaded fishing tackle device, as described in claim 1, wherein the compression spring has a spring stiffness value determined by the spring's size and composition.

3. A reverse action, spring-loaded fishing tackle device, as described in claim 1, wherein the partially-split, center circular spacer-disk is permanently secured to the center interior portion of the cylindrical casing.

4. A reverse action, spring-loaded fishing tackle device, as described in claim 3 wherein the partially-split, center spacer-disk, wherein said slit allows a center coil of said spring to pass through the partially-split, center spacer-disk and not around it.

5. A reverse action, spring-loaded fishing tackle device, as described in claim 4, wherein the partially-split, center spacer-disk, acts as a center compressional barrier for both sides of the spring to be compressed into.

6. A reverse action, spring-loaded fishing tackle device, as described in claim 1, wherein each of the first and second end washer-disks have a radial diameter larger than the diameter of the spring and smaller than the cross-sectional interior diameter of the chamber.

7. A reverse action, spring-loaded fishing tackle device, as described in claim 6, wherein each end washer-disk is oriented such that its radial axis is placed perpendicular to the chamber longitudinal axis.

8. A reverse action, spring-loaded fishing tackle device, as described in claim 7, wherein said hole in each end washer-disk has is drilled through a center portion of it allowing said respective line cords to pass through from the interior chamber and out through to the respective port opening.

9. A reverse action, spring-loaded fishing tackle device, as described in claim 8, wherein each end washer-disk, has an anchor spot for securing the respective line cords.

10. A reverse action, spring-loaded fishing tackle device, as described in claim 1, whereby when both line cords are pulled apart by an outward force, the two halves of said spring are pulled inward by said end washer-disks, which compress said spring into the partially-split, center spacer-disk, and when the pulling force is released, the spring relaxes and is restored to its original uncompressed state, whereby illustrating the reverse action of the spring mechanism, which produces a constant resistive force against any applied force on said line cords whenever the spring mechanism is activated.

* * * * *